(12) United States Patent
Inoue

(10) Patent No.: US 8,781,405 B2
(45) Date of Patent: Jul. 15, 2014

(54) RADIO COMMUNICATION TERMINAL

(75) Inventor: Hiroshi Inoue, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/259,106

(22) PCT Filed: Mar. 25, 2010

(86) PCT No.: PCT/JP2010/002134
§ 371 (c)(1),
(2), (4) Date: Sep. 22, 2011

(87) PCT Pub. No.: WO2010/109880
PCT Pub. Date: Sep. 30, 2010

(65) Prior Publication Data
US 2012/0015609 A1  Jan. 19, 2012

(30) Foreign Application Priority Data
Mar. 26, 2009 (JP) .................................. 2009-077537

(51) Int. Cl.
*H04B 1/00* (2006.01)
*H04B 1/38* (2006.01)
(52) U.S. Cl.
USPC .......................................... 455/68; 455/557
(58) Field of Classification Search
USPC ............................. 455/574, 68, 9, 343.1, 557
See application file for complete search history.

(56) References Cited

U.S. PATENT DOCUMENTS

| | | | |
|---|---|---|---|
| 4,794,649 A * | 12/1988 | Fujiwara | 455/9 |
| 6,804,535 B2 * | 10/2004 | Takahashi | 455/557 |
| 6,804,541 B1 | 10/2004 | Muramatsu et al. | |
| 2003/0060232 A1 * | 3/2003 | Hashimoto et al. | 455/556 |
| 2004/0152495 A1 * | 8/2004 | Choi | 455/574 |
| 2006/0072268 A1 * | 4/2006 | Kang | 361/92 |
| 2009/0307679 A1 * | 12/2009 | Lee et al. | 717/168 |
| 2011/0291609 A1 * | 12/2011 | Bae | 320/103 |

FOREIGN PATENT DOCUMENTS

| | | |
|---|---|---|
| CN | 1278685 A | 1/2001 |
| CN | 1758501 A | 4/2006 |
| CN | 1794189 A | 6/2006 |
| GB | 2354122 A | 3/2001 |

(Continued)

OTHER PUBLICATIONS

International Search Report; PCT/JP2010/002134; Apr. 23, 2010.

(Continued)

*Primary Examiner* — Andrew Wendell
*Assistant Examiner* — Maryam Soltanzadeh
(74) *Attorney, Agent, or Firm* — Studebaker & Brackett PC

(57) ABSTRACT

Provided is a radio communication terminal capable of ending communication processing in a normal manner even if removed from an information processing terminal in the course of the communication processing. According to the present invention, the radio communication terminal operates by receiving power from an external apparatus connected thereto and includes a radio communication unit for performing radio communication with a radio base station, a battery capable of operating the radio communication terminal without receiving power from the external apparatus, and a control unit, in case of disconnection from the external apparatus in the course of the communication processing using the radio communication unit by receiving power from the external apparatus, for controlling the radio communication terminal to switch over to operation powered by the battery and carry out continuing processing to end the communication processing in the normal manner and then to stop the operation powered by the battery.

8 Claims, 5 Drawing Sheets

(56) References Cited

FOREIGN PATENT DOCUMENTS

| | | |
|---|---|---|
| JP | H3-293940 A | 12/1991 |
| JP | 05-028327 A | 2/1993 |
| JP | 06-004852 | 1/1994 |
| JP | 09-330152 A | 12/1997 |
| JP | 2001-5569 A | 1/2001 |
| JP | 2004-151908 A | 5/2004 |
| JP | 2005-327210 A | 11/2005 |
| JP | 2006-184977 A | 7/2006 |
| JP | 2006-209250 A | 8/2006 |
| JP | 2007-172665 A | 7/2007 |
| JP | 2007-183997 A | 7/2007 |
| KR | 10-2007-0066463 A | 6/2007 |

OTHER PUBLICATIONS

Korean Office Action "Notice of Grounds for Rejection" dated Nov. 1, 2012, which corresponds to Korean Patent Application 10-2011-7022318 and is related to U.S. Appl. No. 13/259,106 with translation.

Japanese Office Action "Notification of Reason for Refusal" dated Sep. 25, 2012, which corresponds to Japanese Patent Application No. 2011-505880 and is related to U.S. Appl. No. 13/259,106, with translation.

Japanese Office Action "Notification of Reason for Refusal" dated May 21, 2013, which corresponds to Japanese Patent Application No. 2011-505880 and is related to U.S. Appl. No. 13/259,106, with translation.

An Office Action "Notice of Grounds for Rejection" issued by the Korean Intellectual Property Office on Jun. 14, 2013, which corresponds to Korean Patent Application No. 10-2011-7022318 and is related to U.S. Appl. No. 13/259,106; with translation.

Korean Office Action "Decision of Rejection" dated Apr. 29, 2013, which corresponds to Korean Application No. 10-2011-7022318 and is related to U.S. Appl. No. 13/259,106 with English translation.

The first Office Action issued by the State Intellectual Property Office of People's Republic of China on Sep. 30, 2013, which corresponds to Chinese Patent Application No. 201080013453.8 and is related to U.S. Appl. No. 13/259,106; with concise Explanation.

An Office Action "Decision of Rejection," issued by the Japanese Patent Office on Nov. 26, 2013, which corresponds to Japanese Patent Application No. 2011-505880 and is related to U.S. Appl. No. 13/259,106, with English concise explanation.

An Office Action issued by the Korean Patent Office on Dec. 13, 2013, which corresponds to Korean Patent Application No. 2011-7022318 and is related to U.S. Appl. No. 13/259,106, with English language concise explanation.

* cited by examiner

RADIO COMMUNICATION TERMINAL

CROSS REFERENCE TO RELATED APPLICATION

This application claims priority to and the benefit of Japanese Patent Application No. 2009-77537 (filed on Mar. 26, 2009), the entire contents of which are incorporated herein by reference.

TECHNICAL FIELD

The present invention relates to radio communication terminals, and more specifically, to radio communication terminals removably mounted on information processing terminals (external apparatuses), such as laptop computers or the like, and operated by power supply from the external apparatuses.

BACKGROUND ART

In operating an information processing terminal, such as the laptop computer or the like, it is possible to carry out communication processing by connecting to an external communication network, such as a mobile communication network, by using a radio communication terminal having radio communication means. Such radio communication terminal, in use, is connected to an insertion opening, such as a USB (Universal Serial Bus) port, a card slot or the like, provided to the information processing terminal, and when not in use, can be removed from the insertion opening. There are conventional arts to prevent uncontrollable program runaway and system reset when the radio communication terminal is accidently removed from the information processing terminal in the course of the communication processing (Patent Documents 1, 2).

PRIOR ART DOCUMENTS

Patent Documents

Patent Document 1: JP 5-28327 A
Patent Document 2: JP 6-4852 U

SUMMARY OF INVENTION

Technical Problem

For example, if the radio communication terminal is removed from the information processing terminal in the course of rewriting of PRL (roaming area information) by OTA (Over The Air) or writing of ID information (subscriber information), such as a phone number or the like, the information being rewritten or written became invalid. Therefore, there is a problem that, when the radio communication terminal is reinserted into the insertion opening of the information processing terminal in order to rewrite or write the information as stated above, it starts over the processing to rewrite or write the information, which is a waste of time. In such a case, additionally, the radio communication terminal becomes unstable causing a trouble such as a malfunction. Moreover, it increases a load on a base station, which is a communication counterpart, causing a problem such as deterioration of a communication state.

In addition, the radio communication terminal retains information on a session with the base station in communication. However, if the radio communication terminal is removed from the information processing terminal before retaining the information on the session, the radio communication terminal has to start over from the beginning to retain the information on the session upon a next connection for communication, disadvantageously taking a time for connection.

As countermeasures, the present applicant has invented methods to safely remove the radio communication terminal from the information processing terminal by warning the user attempting to remove the radio communication terminal or by informing the user that the terminal is ready for removal so as to avoid sudden removal of the radio communication terminal from the information processing terminal (Japanese Patent Laid-Open Nos. 2006-184977, 2006-209250, 2007-172665, and 2007-183997).

However, those methods invented by the present applicant still have problems stated above if the user removes the radio communication terminal in the course of the communication processing despite the warning to the user attempting to remove the radio communication terminal. In addition, a real problem of the present invention to solve is power cutoff regardless of structural removal.

Accordingly, it is an object of the present invention, in consideration of such aspects, to provide a radio communication terminal capable of ending the communication processing in a normal manner even in the event of cutoff of the power supply due to, for example, removal of the radio communication terminal from an information processing terminal in the course of communication processing.

Solution to Problem

In order to solve the above problems, a radio communication apparatus according to a first aspect of the present invention operates by receiving power from an external apparatus connected, and includes:

a radio communication unit for performing radio communication with a radio base station;

a battery capable of operating the radio communication terminal without receiving power from the external apparatus; and a control unit, if the radio communication terminal is disconnected from the external apparatus in course of communication processing using the radio communication unit by receiving power from the external apparatus, for controlling the radio communication terminal to switch over to operation powered by the battery and carry out continuing processing to end the communication processing in a normal manner and then to controlling the radio communication terminal to stop the operation powered by the battery.

The radio communication apparatus according to a second aspect of the present invention includes:

a memory unit for storing PRL (roaming information), wherein the control unit, in case of disconnection from the external apparatus in the course of the communication processing to rewrite the PRL in the memory unit, carries out the continuing processing to complete rewriting of the PRL in the memory unit.

The radio communication apparatus according to a third aspect of the present invention includes:

a memory unit for storing subscriber information, wherein the control unit, in case of disconnection from the external apparatus in the course of the communication processing to write the subscriber information in the memory unit, carries out the continuing processing to complete writing of the subscriber information in the memory unit.

The radio communication apparatus according to a fourth aspect of the present invention, wherein the control unit, in case of disconnection from the external apparatus in the course of the communication processing to update the radio communication terminal, carries out the continuing processing to complete updating of the radio communication terminal.

The radio communication apparatus according to a fifth aspect of the present invention, wherein the battery supplies supplementary power for covering shortfall of the power supplied from the external apparatus when the radio communication unit performs radio communication.

Effect of the Invention

According to the present invention, the radio communication terminal has a battery, and in case of disconnection from an information processing terminal in the course of the communication processing, detects such disconnection and carries out continuing processing to end the communication processing in a normal manner by being powered by the battery. Thereby, it is possible to end the communication processing in the normal manner even if the radio communication terminal is removed from the information processing terminal, for example, in the course of the communication processing.

BRIEF DESCRIPTION OF DRAWINGS

FIG. 5 is a flowchart illustrating the continuing processing of the radio communication terminal shown in FIG. 1;

DESCRIPTION OF EMBODIMENT

Embodiments of the present invention will be described with reference to the accompanying drawings.

Figure 1:
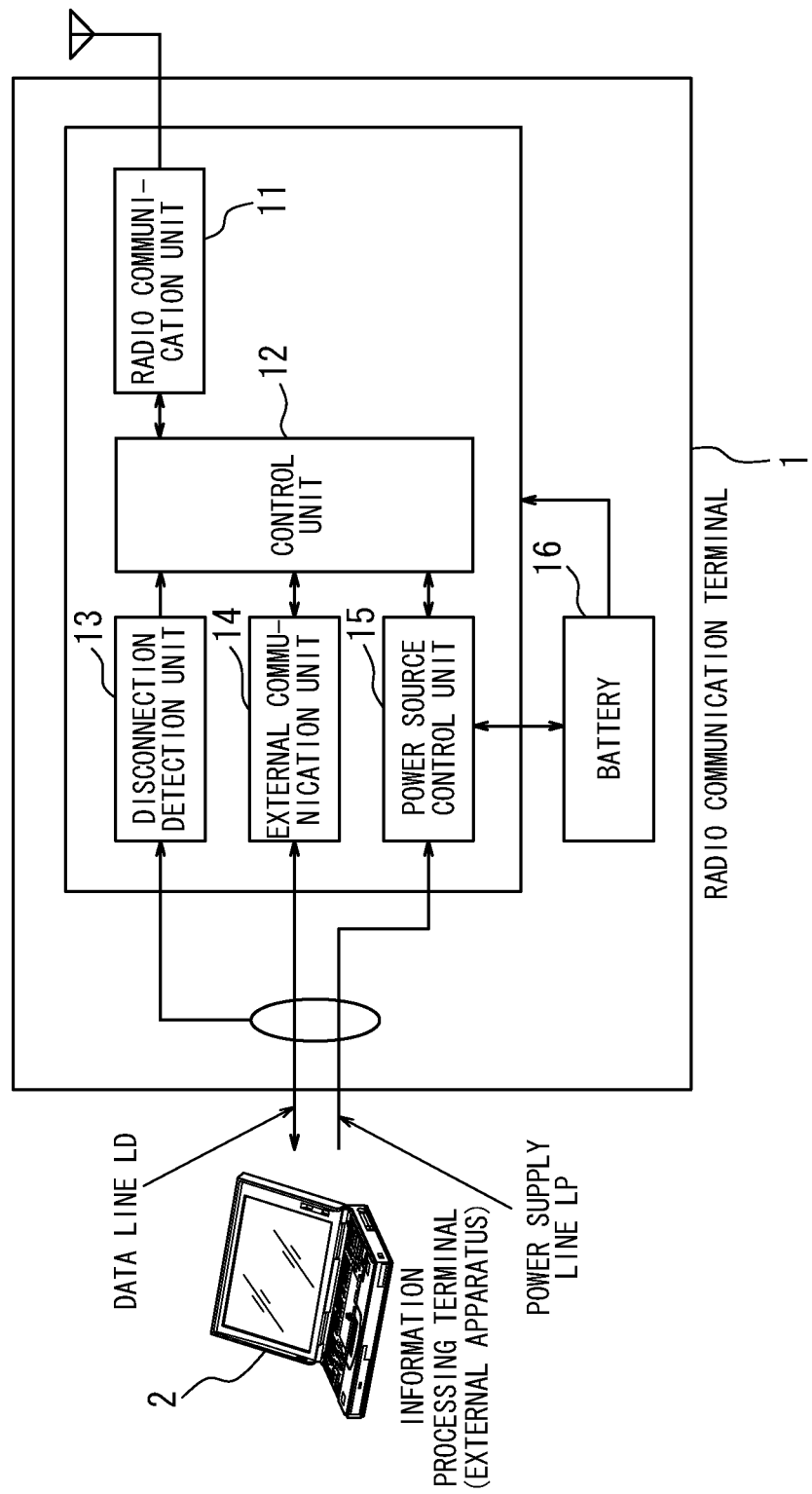
FIG. 1 is a diagram illustrating a schematic configuration of a radio communication terminal according to an embodiment of the present invention.

FIG. 1 is a schematic diagram illustrating a radio communication terminal according to an embodiment of the present invention. A radio communication terminal 1 has a radio communication unit 11, a control unit 12, a disconnection detection unit 13, an external communication unit 14, a power source control unit 15 and a battery 16. The radio communication terminal 1 is connected to an information processing terminal 2 (external apparatus) via a data line LD and a power supply line LP. In the radio communication terminal 1, the data line LD is connected to the external communication unit 14, whereas the power supply line LP is connected to the battery 16 via the power source control unit 15.

Basically, the radio communication terminal 1 is operated by power supplied via the power supply line LP alone, being connected to the information processing terminal 2 However, it can be temporarily powered by the battery 16 mounted therein when disconnected from the information processing terminal 2.

The radio communication unit 11 performs radio communication with a base station (not shown) in a radio communication network. The control unit 12 controls whether to operate its own terminal (radio communication terminal 1) by power supply from the information processing terminal 2 or to operate its own terminal (radio communication terminal 1) by the battery 16. The disconnection detection unit 13 detects disconnection of its own terminal (radio communication terminal 1) from the information processing terminal 2. The disconnection detection terminal 13 can detect, by monitoring, for example, voltage of the power supply line LP, disconnection from a change (drop or the like) in the voltage. Alternatively, the disconnection detection terminal 13 can detect, by monitoring, for example, voltage of the data line LD, disconnection from a change (drop or the like) in the voltage. The external communication unit 14 exchanges data with the information processing terminal 2 via the data line LD. The power source control unit 15 supplies the power from the information processing terminal 2 supplied via the power supply line LP to the battery 16. The battery 16 stores power for operating its own terminal (radio communication terminal 1) without the power supply from the information processing terminal 2. The battery 16 stores the power from the information processing terminal 2 while its own terminal (radio communication terminal 1) is connected to the information processing terminal 2 and after disconnection between its own terminal (radio communication terminal 1) and the information processing terminal 2, can use such stored power to operate its own terminal (radio communication terminal 1).

Here, the radio communication terminal 11 may be any suitable interface device corresponding to any radio communication system. In addition, the control unit 12, the disconnection detection unit 13, the external communication unit 14 and the power source control unit 15 may be implemented by software executed on any suitable processor, such as a CPU (Central Processing Unit), or a dedicated processor (for example, DSP (Digital Signal Processor)) specialized in each processing.

When the radio communication terminal 1 is connected to the information processing terminal 2, the disconnection detection unit 13 recognizes such a connection by monitoring the voltage of the power supply line LP, for example. Triggered by such a recognition of the connection (that is, start of power supply), the control unit 12 starts driving its own terminal (radio communication terminal 1) with the power supplied from the information processing terminal 2. Upon start of driving by the control unit 12, the radio communication unit 11 establishes a radio link with the base station (not shown) in the radio communication network and carries out communication processing. For example, when the information processing terminal 2 performs data communication, the external communication unit 14 exchanges data with the information processing terminal 2 via the data line LD and the radio communication unit 11 transmits and receives the data to/from the base station (not shown).

Here, examples of communication processing include rewriting of PRL by OTA, writing of ID information (subscriber information) such as a telephone number, updating of firmware or a function of a modem unit, and the like. The examples of communication processing also include standby operation, handover (handoff) and retaining of session information exchanged with the base station.

Normally, in order to disconnect the radio communication terminal 1 from the information processing terminal 2, control information indicating disconnection is transmitted from the information processing terminal 2 to the radio communication terminal 1 via the data line LD. The control unit 12 of the radio communication terminal 1 carries out processing to end ongoing communication processing in a normal manner in accordance with the control information from the information processing terminal 2 Then, after ending the communication processing in the normal manner and it becomes safe to disconnect the radio communication terminal 1 from the information processing terminal 2, the radio communication terminal 1 transmits the control information indicating accordingly to the information processing terminal 2. In response to the control information from the radio communication terminal 1, the information processing terminal 2 notifies a user that the radio communication terminal 1 can be safely disconnected. Being notified, the user removes the radio communication terminal 1 from the information processing terminal 2.

Here, the radio communication terminal 1 starts operation (power ON) by the power supplied from the information processing terminal 2 after connected to the information processing terminal 2, as described above. Therefore, it is to be noted that the radio communication terminal 1 has a configuration different from a handset type terminal, such as a mobile phone, which is operated before connection to the information processing terminal 2 and capable of performing radio communication.

In addition, if the communication processing ends in the normal manner after disconnection from the information processing terminal 2, the radio communication terminal 1 stops its operation (power OFF). In addition, if the information processing terminal 2, being connected to the radio communication terminal 1, is turned off, or if the radio communication terminal 1 is disconnected (canceled) from the information processing terminal 2, the radio communication terminal 1 can stop its operation (power OFF) in conjunction with the information processing terminal 2. Hence, it is to be noted that the radio communication terminal 1 has the configuration different from a handset type terminal, such as a mobile phone, which is turned off by a user operating a power button or the like.

Here, the user may remove the radio communication terminal 1 from the information processing terminal 2 without waiting for the notification on safe removal even in the course of the communication processing by the radio communication terminal, as described above.

Figure 2:
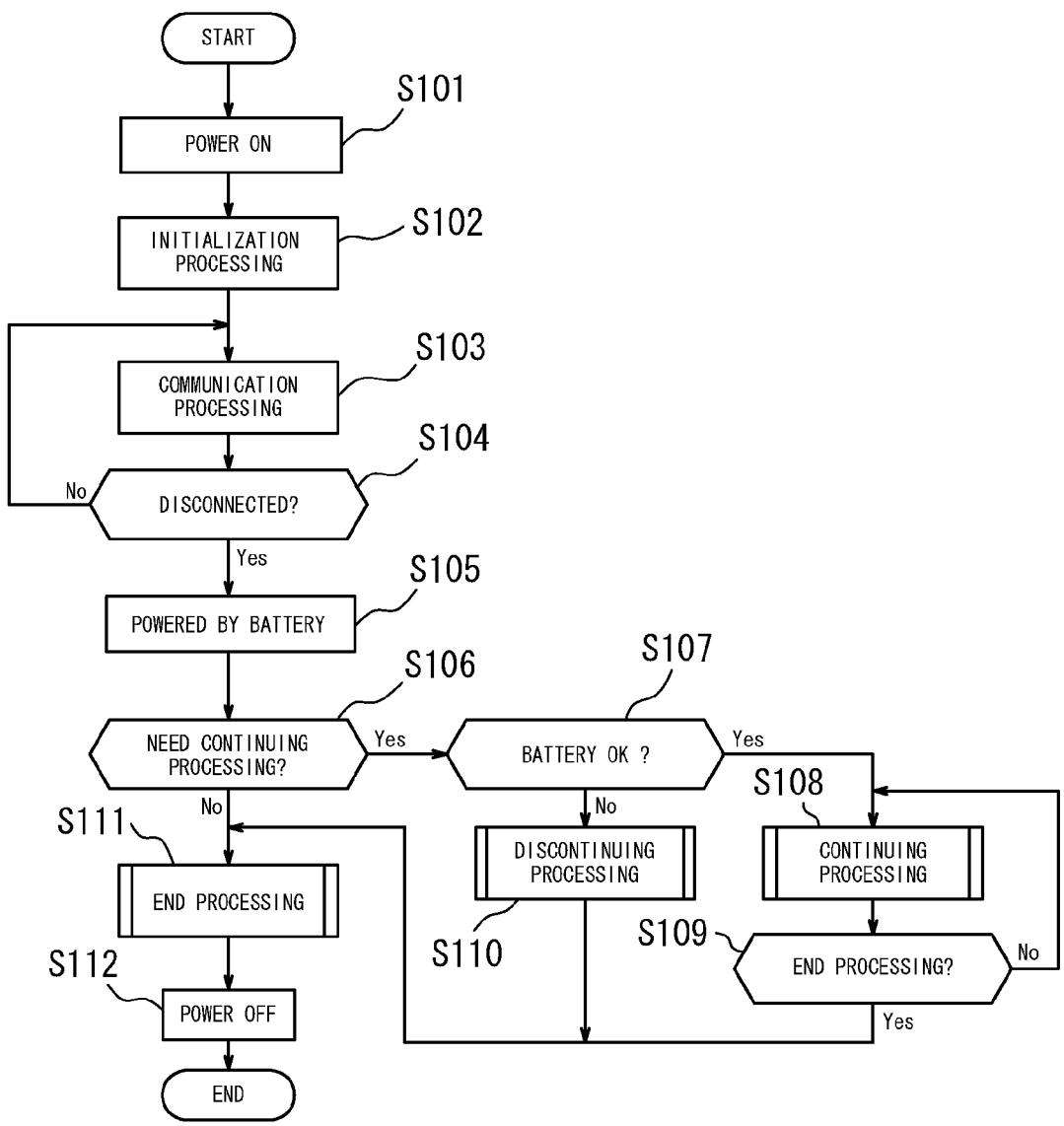
FIG. 2 is a flowchart illustrating operations of the radio communication terminal shown in FIG. 1.

FIG. 2 is a flowchart illustrating operations of the radio communication terminal 1 to carry out continuing processing and discontinuing processing in order to end the communication processing in the normal manner if removed from the information processing terminal 2 in the course of the communication processing.

First, when the user connects the radio communication terminal 1 to the information processing terminal 2, the control unit 12 starts driving (power ON) its own terminal (radio communication terminal 1) with the power supplied from the information processing terminal 2 (step S101). The radio communication unit 11 carries out initialization processing, such as establishment of a radio link with the base station (step S102), and then starts the communication processing with the base station (step S103). During the communication processing, the disconnection detection unit 13 monitors the voltage of the data line LD or the power supply line LP to detect disconnection between its own terminal (radio communication terminal 1) and the information processing terminal 2 (step S104).

When the disconnection detection unit 13 detects disconnection between its own terminal (radio communication terminal 1) and the information processing terminal 2 (Yes of step S104), the control unit 12 controls its own terminal (radio communication terminal 1) to switch over to operation powered by the battery 16 (step S105). Subsequently, the control unit 12 determines whether it is necessary to carry out the continuing processing in order to end the ongoing communication processing in the normal manner based on contents thereof (step S106). Here, the continuing processing to end the communication processing in the normal manner includes any processing to end the communication processing appropriately. For example, it includes carrying out the communication processing to a delimited point for reduction of a communication load after re-connection and processing to prevent unstable operations of the radio communication terminal 1 due to disconnection.

When determining that it is necessary to carry out the continuing processing (Yes of step S106), the control unit 12 refers to the remaining power of the battery 16 through the power control unit 15 and determines whether the remaining power is sufficient to carry out the continuing processing (step S107). For determination of the remaining power, it is possible to prepare a table of predetermined continuing processing and required power corresponding to the continuing processing, for example.

If determining that the remaining power of the battery 16 is sufficient (Yes of step S107), the control unit 12 carries out the continuing processing to end the ongoing communication processing in the normal manner (step S108).

If determining that the remaining power of the battery 16 is not sufficient (No at step S107), the control unit 12 carries out the discontinuing processing for discontinuing the ongoing communication processing (step S109). Here, the discontinuing processing for discontinuing the communication processing includes any processing for ending the communication processing appropriately which can be performed with limited power. For example, it may include carrying out, with the limited power, the communication processing to the delimited point for reduction of the communication load after re-connection and processing to prevent unstable operations of the radio communication terminal 1 due to disconnection.

The control unit 12 carries out end processing of each of the units (for example, the radio communication unit 11, the disconnection detection unit 13, the external communication unit 14 and the power source control unit 15) of its own terminal (radio communication terminal 1) in any of the following cases (step S111): the continuing processing ends at step S109; the discontinuing processing is carried out at step S110; and the continuing processing is not necessary at step S107.

Figure 3:
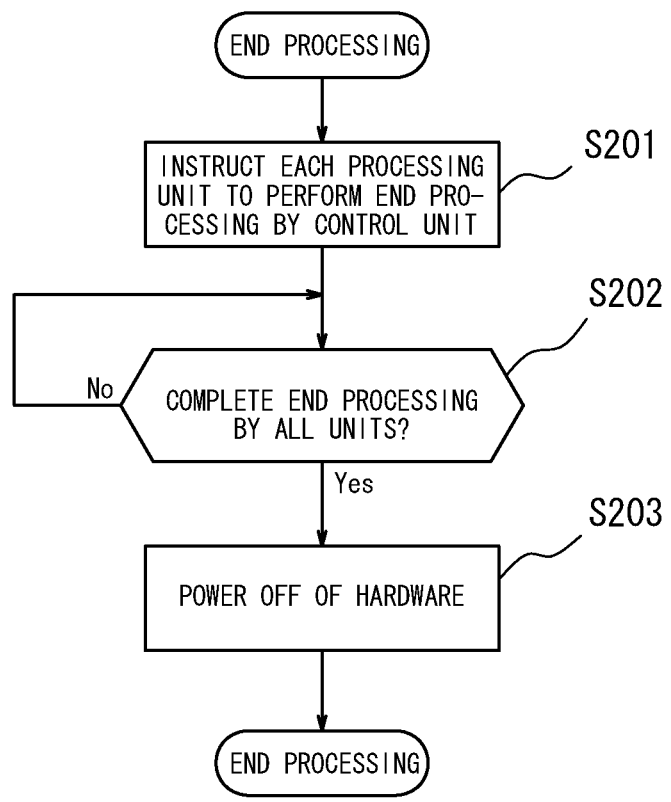
FIG. 3 is a flowchart illustrating a continuing processing of the radio communication terminal shown in FIG. 1.

FIG. 3 is a flowchart of the end processing. The control unit 12 instructs processing units to carry out end processing programs to shift to a power OFF state (step S201). When the control unit 12 recognizes that all of the processing units completes execution of the end processing programs (step S202), the control unit 12 stops hardware of each of the processing units (step S203). It is also possible to stop the hardware of each of the processing units by the end processing programs carried out by the processing units.

When the end processing of each of the processing units is completed, the control unit 12 stops (power OFF) operation of its own terminal (radio communication terminal 1) by the battery 16.

According to the present embodiment, as stated above, the radio communication terminal 1 has the battery 16, and if removed from the information processing terminal 2 in the course of the communication processing, detects such disconnection from the information processing terminal 2 and carries out the continuing processing (discontinuing processing) to end the communication processing in the normal manner by being powered by the battery 16. Therefore, even if removed from the information processing terminal 2 in the course of the communication processing, the radio communication terminal 1 can end the communication processing in the normal manner. In addition, since the radio communication terminal 1 stops (power OFF) operations after the continuing processing (discontinuing processing), no more power of the battery 16 will be consumed from the point, avoiding unnecessary power consumption.

Figure 4:
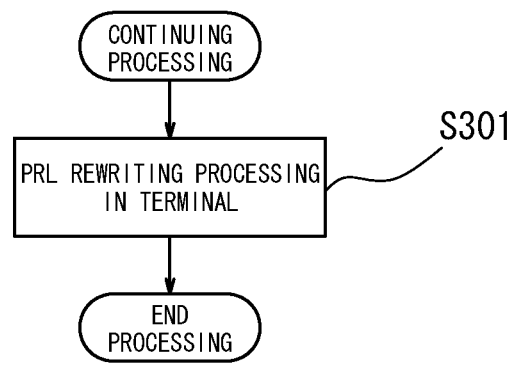
FIG. 4 is a flowchart illustrating the continuing processing of the radio communication terminal shown in FIG. 1.

FIG. 4 is a flowchart illustrating the continuing processing carried out if the communication processing is rewriting of the PRL (roaming area information) by the OTA. In this case, the radio communication terminal 1 has a memory unit (not shown) for storing the PRL in addition to the configuration shown in FIG. 1. If the communication processing is rewriting of the PRL by the OTA, the control unit 12, at step S106, determines that it is necessary to carry out the continuing processing if the radio communication terminal 1 is disconnected from the information processing apparatus 2 in the course of rewriting of the PRL in the memory unit. Then, the control unit 12 completes rewriting of the PRL in the memory unit as shown in FIG. 4 (step S301), as the continuing processing at step S108.

According to the present embodiment, as stated above, the radio communication terminal 1 carries out the continuing processing to complete rewriting of the PRL in the memory unit. Therefore, even if the radio communication terminal 1 is removed from the information processing terminal 2 in the course of rewriting of the PRL, the communication processing ends in the normal manner without wasting the information which has been rewritten. Accordingly, when the radio communication terminal 1 is inserted into the insertion opening and re-connected to the information processing terminal 2, it is not necessary to start over from the beginning of rewriting of information but possible to quickly start processing such as the radio communication.

FIG. 5 is a flowchart illustrating the continuing processing carried out if the communication processing is writing of the ID information (subscriber information), such as the telephone number, by the OTA. In this case, the radio communication terminal 1 has a memory unit (not shown) for storing the subscriber information in addition to the configuration shown in FIG. 1. If the communication processing is writing of the subscriber information by the OTA, the control unit 12, at step S106, determines that it is necessary to carry out the continuing processing if the radio communication terminal 1 is disconnected from the information processing apparatus 2 in the course of writing of the subscriber information in the memory unit. Then, at step S108, the control unit 12 completes writing of the subscriber information in the memory unit as shown in FIG. 5 (step S401), and transmits a completion notification indicating completion of writing of the subscriber information to a management server (not shown) managing the subscriber information via the radio communication unit 11 (step S402).

According to the present embodiment, as stated above, the radio communication terminal 1 carries out the continuing processing to complete writing of the subscriber information in the memory unit. Therefore, even if the radio communication terminal 1 is removed from the information processing terminal 2 in the course of writing of the subscriber information, the communication processing ends in the normal manner without wasting the information which has been written. Accordingly, when the radio communication terminal 1 is inserted into the insertion opening and re-connected to the information processing terminal 2, it is not necessary to start over from the beginning of writing of information but possible to quickly start the processing such as the radio communication. In addition, since the completion notification indicating completion of writing is transmitted to the management server, it is possible to prevent unnecessary retransmission of information from the management server.

Figure 6:
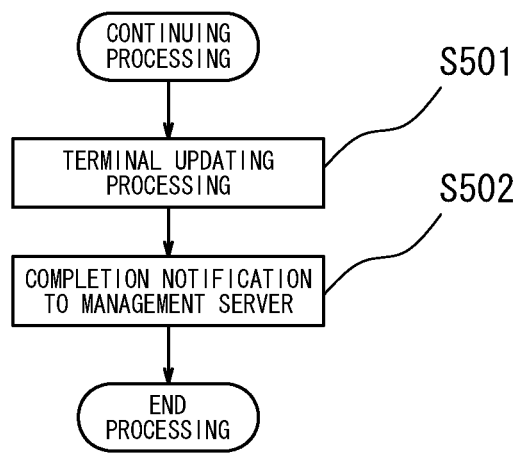
FIG. 6 is a flowchart illustrating the discontinuing processing of the radio communication terminal shown in FIG. 1.

FIG. 6 is a flowchart illustrating the continuing processing carried out if the communication processing is updating of its own terminal by the OTA. Here, updating includes updating of the firmware of the modem, a function of each of the processing units and the like. In this case, the control unit 12, at step S106, determines that it is necessary to carry out the continuing processing if the radio terminal 1 is disconnected from the information processing apparatus 2 in the course of updating of its own terminal Then, at step S108, the control unit 12 completes updating of its own terminal as shown in FIG. 6 (step S501), and transmits a completion notification indicating completion of updating to the management server (not shown) managing update information via the radio communication unit 11 (step S502).

According to the present embodiment, as stated above, the radio communication terminal 1 carries out the continuing processing to complete updating. Therefore, even if the radio communication terminal 1 is removed from the information processing terminal 2 in the course of updating, the communication processing ends in the normal manner without wasting the information which has been processed. Accordingly, when the radio communication terminal 1 is inserted into the insertion opening and re-connected to the information processing terminal 2, it is not necessary to start over from the beginning of updating but possible to quickly start the processing such as the radio communication. Moreover, it is possible to prevent the terminal from being disabled (broken) by the updating being interrupted. In addition, since the completion notification indicating completion of updating is transmitted to the management server, it is possible to prevent unnecessary retransmission of information from the management server.

Figure 7:
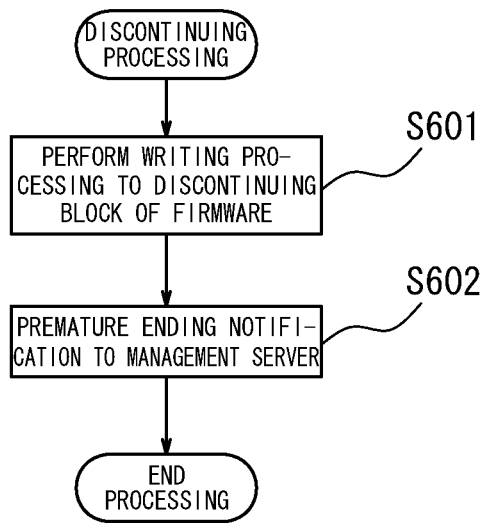
FIG. 7 is a flowchart illustrating the end processing of the radio communication terminal shown in FIG. 1.

FIG. 7 is a flowchart illustrating the discontinuing processing. Since the discontinuing processing is carried out when the remaining power of the battery 16 is not sufficient to carry out the continuing processing, it is not to complete entire communication processing. However, even if the radio communication terminal 1 is removed from the information processing terminal 2 in the course of the communication processing, it is possible to end the communication processing in the normal manner by carrying out the communication processing to a certain point using the limited power. For example, if the communication processing is updating of the firmware of its own terminal by the OTA, the control unit 12 continues to write as far as a discontinuing block of the firmware (step S601) such that the discontinuing block becomes a delimiter of updating and then transmits a premature ending notification indicating that the updating has ended prematurely to the management server (not shown) managing the update information via the radio communication unit 11 (step S602).

According to the present embodiment, as stated above, the radio communication terminal 1 carries out the discontinuing processing to complete updating processing partially. Therefore, even if the radio communication terminal 1 is removed from the information processing terminal 2 in the course of updating and there is no sufficient power in the battery 16, the communication processing ends in the normal manner without wasting the updated information. Accordingly, when the radio communication terminal 1 is inserted to the insertion opening and re-connected to the information processing terminal 2, it is not necessary to start over from the beginning of updating but possible to quickly start the processing such as the radio communication. In addition, it is possible to prevent the terminal from being disabled (broken) by the updating being interrupted. Moreover, since the premature ending notification indicating that the updating has ended prematurely is transmitted to the management server, it is possible, after re-connection, for the management server to transmit only a part of updating data necessary to be retransmitted to the radio communication terminal 1.

Although the present invention is described based on figures and the embodiment, it is to be understood that those skilled in the art may easily vary or alter in a multiple manner based on disclosure of the present invention. Accordingly, such variation and modification are included in a scope of the present invention. For example, each function included in each component can be rearranged avoiding a logical inconsistency, and a plurality of components can be combined or divided.

The radio communication terminal 1 according to the present invention has a configuration to operate basically only by the power from the power supply line LP after connected to the information processing terminal 2. However, under certain conditions, such as if it is necessary to increase transmission output of the radio communication unit 11 in order to connect a radio link since the information processing terminal 2 is remote from the base station (not shown), the radio communication terminal can receive the power supplied from the battery 16 to boost power temporarily. Thereby, even if quality of the radio communication with a remote base station becomes deteriorated and it is thus difficult for the control unit 12 to end the communication processing in the normal manner, it is possible to end the communication processing in the normal manner by increasing the transmission output of the radio communication unit 11 with temporary power supply from the battery 16. Also, when there is a plurality of radio communication units, it is possible to operate them simultaneously by the power supply from the battery 16 as the supplementary power.

In addition, the continuing processing carried out by the radio communication terminal 1 is not limited to rewriting of the PRL by the OTA, writing of the subscriber information and updating, as shown in FIG. 4 to FIG. 6. For example, if carrying out the communication processing to perform the standby operation or to exchange the control information for handover, the control unit 12 can complete storing of the standby operation or the control information for handover. Moreover, if carrying out the communication processing to exchange the session information with the base station, the control unit 12 can complete storing of the session information as the continuing processing.

REFERENCE SIGNS LIST 1 radio communication terminal
2 information processing terminal (external apparatus)
11 radio communication unit
12 control unit
13 disconnection detection unit
14 external communication unit
15 power source control unit
16 battery
LP power supply line
LD data line

The invention claimed is:

1. A radio communication terminal operating by receiving power from an external apparatus connected thereto, comprising:
 a radio communication unit for performing radio communication of data of the external apparatus with a radio base station;
 a battery; and
 a control unit, if the radio communication terminal is disconnected from the external apparatus in course of communication processing of the data of the external apparatus using the radio communication unit by receiving power from the external apparatus, for controlling the radio communication terminal to switch over to operation powered by the battery to end the communication processing of the data of the external apparatus in a normal manner and then controlling the radio communication terminal to stop the operation powered by the battery.

2. The radio communication terminal according to claim 1, comprising a memory unit for storing PRL (roaming information), wherein
 the control unit, in case of disconnection from the external apparatus in the course of the communication processing to rewrite the PRL in the memory unit, carries out the continuing processing to complete rewriting of the PRL in the memory unit.

3. The radio communication terminal according to claim 1, comprising a memory unit for storing subscriber information, wherein
 the control unit, in case of disconnection from the external apparatus in the course of the communication processing to write the subscriber information in the memory unit, carries out the continuing processing to complete writing of the subscriber information in the memory unit.

4. The radio communication terminal according to claim 1, wherein the control unit, in case of disconnection from the external apparatus in the course of the communication processing to update the radio communication terminal, carries out the continuing processing to complete updating of the radio communication terminal.

5. The radio communication terminal according to claim 1, wherein the battery supplies supplementary power for covering shortfall of the power supplied from the external apparatus when the radio communication unit performs radio communication.

6. The radio communication terminal according to claim 2, wherein the battery supplies supplementary power for covering shortfall of the power supplied from the external apparatus when the radio communication unit performs radio communication.

7. The radio communication terminal according to claim 3, wherein the battery supplies supplementary power for covering shortfall of the power supplied from the external apparatus when the radio communication unit performs radio communication.

8. The radio communication terminal according to claim 4, wherein the battery supplies supplementary power for covering shortfall of the power supplied from the external apparatus when the radio communication unit performs radio communication.

* * * * *